Dec. 13, 1955 W. H. JAMES III 2,726,603
ROCKET MOTOR
Filed Feb. 10, 1954 2 Sheets-Sheet 2
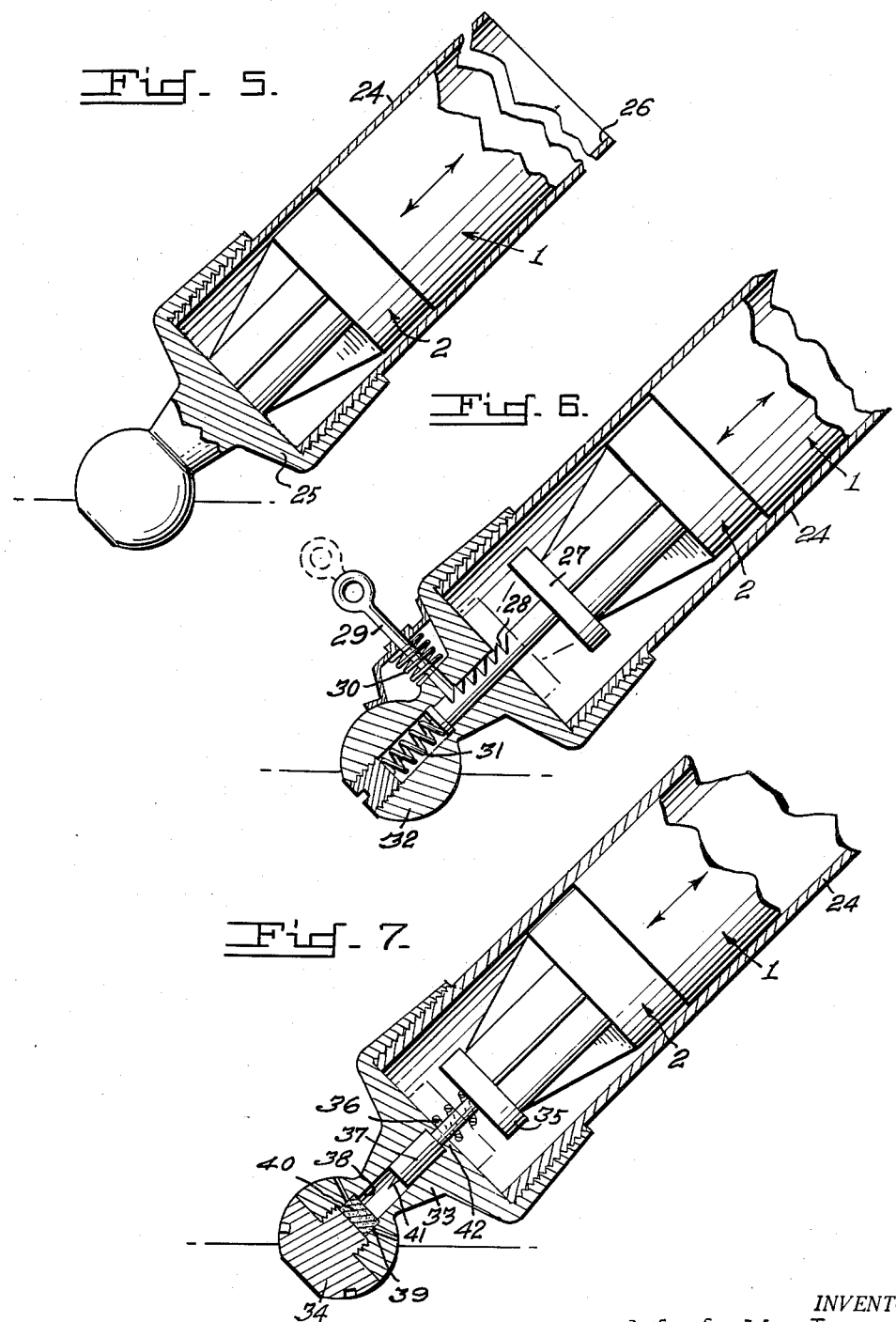
INVENTOR.
Wade H. James, III
BY
W. E. Thibodeau, A. W. Dew & S. J. Rotondi, Jr.
ATTORNEYS.

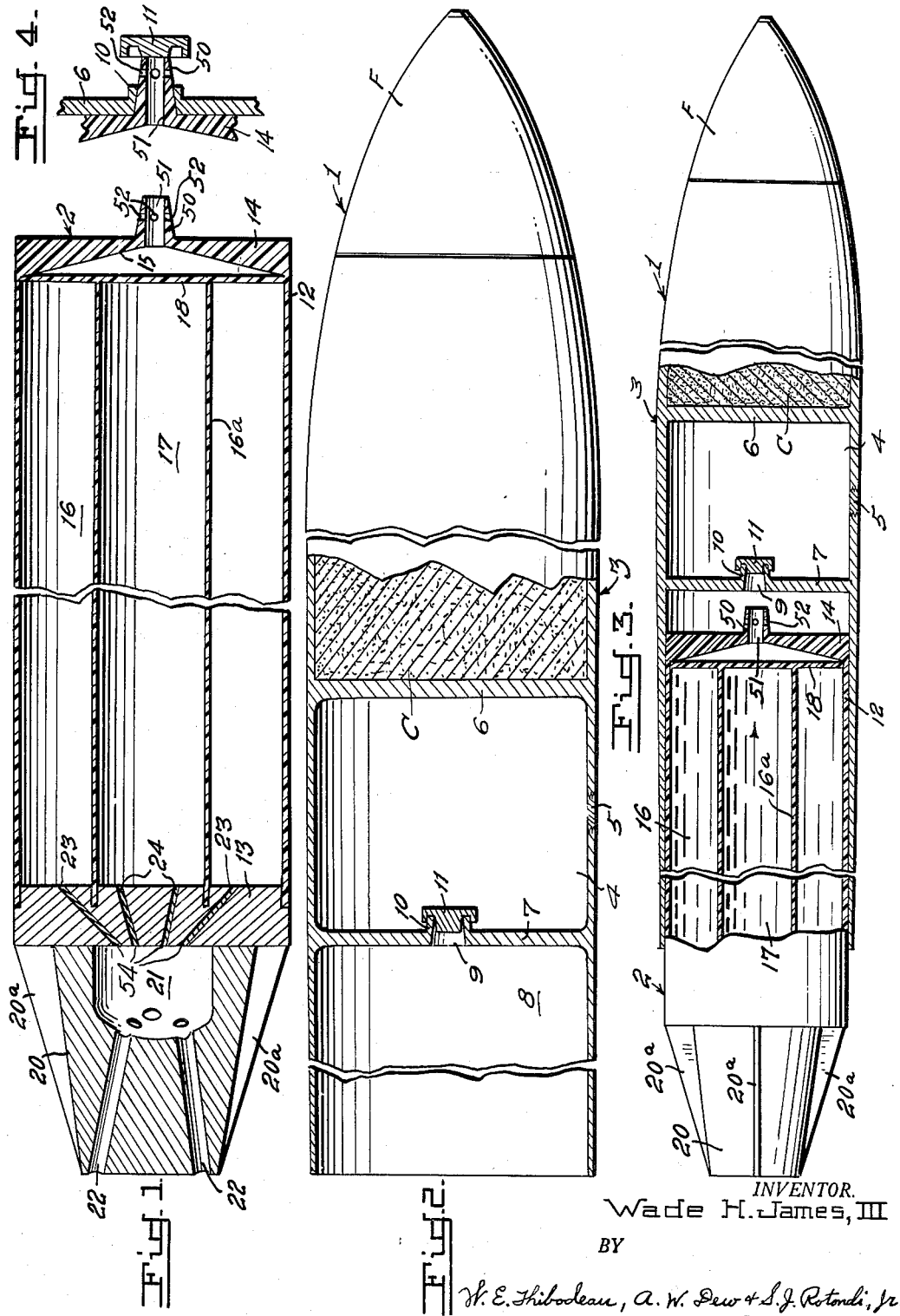

United States Patent Office 2,726,603
Patented Dec. 13, 1955

2,726,603

ROCKET MOTOR

Wade H. James, III, Stillwater, Okla.

Application February 10, 1954, Serial No. 409,544

11 Claims. (Cl. 102—49)

(Granted under Title 35, U. S. Code (1952), sec. 266)

The invention described herein may be manufactured and used by or for the Government for governmental purposes without the payment to me of any royalty thereon.

The present invention relates to a new and improved rocket which comprises a separate, detachable motor.

More particularly, the present invention relates to a novel rocket which consists of a warhead missile body, and of a separate rocket motor to be inserted into the missile body before firing, and which utilizes hypergolic fuels normally stored in coaxial tanks in the rocket motor, the fuel becoming pressurized, only after insertion of the rocket motor into the missile body, from a separate pressurized gas tank which forces the fuel from the coaxial tanks into a combustion chamber.

It is therefore a primary object of this invention to provide a novel, improved rocket having a separable motor.

It is another object of this invention to provide a separate, light-weight rocket motor for a rocket which lends itself readily to mass production and which facilitates storage thereof prior to actual use.

Still another object of the present invention is to provide a new and improved light-weight rocket motor which includes coaxial liquid fuel tanks made of flexible material.

Yet another and further object of the present invention is to provide an improved rocket motor which utilizes hypergolic fuels stored under normal atmospheric pressure in coaxial tanks forming a part of the rocket motor.

A still further object of the present invention is to provide separable rocket and motor members so constructed that when the motor member is telescoped within the rocket member just prior to firing, and a sharp impact is applied to the base of the motor member, the combustion of the propellants in the motor member will be initiated to propel the rocket.

The specific nature of the invention as well as other objects and advantages thereof, will clearly appear from a description of a preferred embodiment as shown in the accompanying drawings in which:

Figure 1 is a longitudinal section view through the rocket motor portion,

Figure 2 is a similar view of the warhead or forward rocket portion,

Figure 3 is a view of the two portions united into a missile in position for intiating the launching thereof, Figure 4 is a detail section view illustrating how the nozzle on the motor pushes out the sealing plug of the pressurized chamber of the rocket, Figure 5 is a fragmentary sectional view illustrating how the rocket may be fired by dropping same into a mortar-like tube, Figure 6 is a similar view illustrating how the rocket can be fired by the action of a spring-loaded piston located at the base of a mortar-like tube, and, Figure 7 is a view similar to Figure 6 wherein a small charge is used to actuate the piston.

In the drawings, wherein for purposes of illustration, is shown a preferred embodiment of the invention, reference character 1 designates a rocket body or warhead generally and 2 a separate rocket motor constructed from a light-weight material, such as plastic, etc. The forward portion 3 of the rocket body is of conventional construction and contains a charge or payload C and a fuze F for detonating the charge in the well known manner. Located medially within the rocket body, there is provided a pressure tight chamber 4 adapted to contain a gas under pressure for a purpose to be later described. This chamber may be provided with a suitable closure 5 for filling the chamber. A transverse wall 6 divides the chamber 4 from the forward portion of the rocket while a second transverse wall 7 separates the chamber from a rearwardly extending tubular portion 8 of the rocket. Wall 7 is provided with a coaxial opening 9 therein, encompassed by a forwardly extending annular boss 10 into which is snugly fitted a sealing cap or plug 11 to seal the opening 9. The rearward portion 8 of the rocket body 1 is open at its rear end for telescopically receiving the motor 2 in a manner to be described.

The motor 2 is formed as a tubular member having an outer wall 12 and having respectively a rearward transverse wall 13 of substantial thickness and forward transverse wall 14 provided with a conical rearward face 15 tapering forwardly and axially as seen in Figure 1. A second tubular member 16a concentric within wall 12 extends between the rear wall 13 and forwardly to a locus defined by the base of conical face 15, and together with wall 12 forms coaxial outer and inner tanks 16 and 17. Tanks 16 and 17 are closed off at their forward ends by a transverse rupturable diaphragm 18 for a purpose to be later described.

Extending rearwardly and integral with rear wall 13, motor 2 is provided with a concentric cylindrical boss 20 of slightly reduced diameter having elongated strengthening webs 20a and provided forwardly with hollowed out space 21 forming a combustion chamber, and rearwardly with a plurality of helical nozzles 22 for permitting the products of combustion to be expelled from the combustion chamber to atmosphere to provide forward thrust and stabilizing rotation to the rocket in the well known manner. Rear wall 13 is also provided with a plurality of concentric rearwardly and axially inwardly inclined fuel escape ports 23, 24 leading respectively from tanks 16 and 17 to combustion chamber 21, and which are normally plugged in any convenient manner as, for example, with one-way pressure responsive check or flap valves or with hardened wax as indicated at 54 to seal off the tanks and prevent the escape of fuels therefrom. Extending forwardly from the front face of transverse wall 14 and integral therewith there is formed a forwardly tapering boss 50 having a maximum diameter equal to the diameter of hole 9, and provided with an axial bore 51 which also extends through transverse wall 14 to communicate with the space above diaphragm 18. Boss 50 is also provided with a plurality of circumferentially disposed transverse holes 52, located so as to lie above the forward end of boss 10 when rocket motor 2 is placed in intussuscepted relation with the forward end 3 of rocket 1.

As previously explained use is made of liquid propellants which are injected separately into a combustion chamber to unite and ignite spontaneously, thereby eliminating auxiliary igniting or preheating means. In the usual case the liquid propellants are a fuel and an oxidizer. Fuels which have been found satisfactory are liquid organic compounds containing at least one amine radical such as aniline, orthotoluidine, and methalgmine, organic compounds such as hydrazine, pyridine, pyrole, terpinole, terpene, or liquid hydrocarbons of the acetylene type and containing a large fraction of unsaturated carbons bonds, for example, divinyl acetylene, depropargyl, and propargyl alcohol. The oxidizers may be nitric acid, liquid nitrogen dioxide, hydrogen peroxide and other substances of a similar nature. The liquid fuel and oxidizer are loaded into tanks 16 and 17, the selection of each propellant for the corresponding tank, and the sizes of fuel escape ports 23, 24, depending on the rates of injection of the oxidizer and fuel to the combustion chamber, the inherent combustion properties of the propellants, and the size and temperature (for example atmospheric temperature and pressure) of the combustion chamber to give smooth nonexplosive combustion while providing the desired quantity of propulsive power. A gas under pressure is placed into chamber 4, preferably a gas which is inert to either propellant, such as nitrogen.

The nature of the invention is such that the forward end of the rocket assembly, or the end receiving the payload may be loaded, stored and shipped to the point of use separately from the loaded, separable rocket motor. In the operation of the device the motor 2 is first inserted into the rear open end 8 of the rocket, with the boss 50 forward, such that the boss lies in close proximity to, but axially aligned with opening 9, and spaced axially rearwardly thereof. Suitable means (not shown) may be employed to assure the proper positioning of the motor in the rocket assembly. The rocket is now ready to be fired by any means suitable to drive the motor forwardly in the assembly. When this is accomplished plug or boss 50 unseats cap 11 and permits the inert gas to pass through holes 51 and 52 to exert sufficient pressure upon diaphragm 18 to cause it to rupture, whereupon the pressure exerted upon the surfaces of the propellent fuels, forces the fuels to escape by way of gas escape ports 23 and 24 into combustion chamber 21 where ignition and combustion take place. The gases of combustion then are emitted from rocket nozzles 22 to propel the rocket forwardly and to cause the same to spin for gyroscopic stabilization. It is important to note that since wall 12 is made of expansible plastic material, an air tight seal or union is effected between it and the inner surface of rocket motor space 8, as the plastic wall distends under the influence of gas pressure.

Suitable means may be employed to impart a sharp impact or push to the base of the rocket motor and to drive it further into the rocket body to unseat cap 11. Three exemplifications of how this may be accomplished are illustrated in Figures 5, 6 and 7. Figure 5 shows a mortar like launching tube 24 having a flat surface at the bottom 25 thereof. The rocket assembly is dropped into the tube 24 through muzzle end 26 in the same manner as when loading a mortar. The base of the motor 2 will strike the bottom surface 25 of the tube causing the motor and rocket body to telescope and unseat cap 11 to initiate the propelling mechanism of the rocket. To provide sufficient impetus to the downward travel of the rocket in tube 24 a driver rocket (not shown) may be secured to the nose of the rocket to assure adequate driving force for low angle firing and for firing in point-blank position.

In Figure 6 a mortar tube 24 is provided with a spring-loaded piston mechanism in its base. A piston 27 is adapted to be held in cocked position by a ratchet 28 and pawl 29. The pawl 29 is urged against the ratchet 28 by a coil spring 30. A coil spring 31 positioned in the base member 32 serves to drive the piston upwardly in the tube 24 when released by a pull on pawl 29, thereby imparting a sharp impact to the base of the rocket motor to again unseat cap 11 to set the before described process in motion.

In the example illustrated in Figure 7, the tube 24 has a base 33 provided with a detachable closure 34 at its lower end and a piston 35 normally biased upwardly by a coil spring 36. The piston is provided at its lower end with a plunger 37 sliding in a bore 38 within the base. This bore is counterbored at 39 in its lower end to provide a space for receiving a small explosive charge 40.

Plunger 37 is provided with a rearwardly directed firing pin 41. In operation, the rocket assembly is dropped into the tube 24. The assembly strikes the piston 35 depressing plunger 37 causing firing pin 41 to contact charge 40 causing an explosion. The piston 35 is driven sharply upwardly until stopped by a shoulder 42 at the upper end of bore 38. The propulsion of the rocket will be initiated.

The three specific embodiments illustrated make use of a mortar like tube having a closed breech end. It is within the purview and scope of this invention to utilize a bazooka-like open ended tubular launcher, in which case impetus to drive the rocket motor into firing relation with the payload portion of the rocket can be supplied by a hammer pivotable upon the breech end of the launcher tube and actuable to force the rocket motor into position.

From the foregoing, it is apparent that a rocket has been developed that can be easily and safely stored, transported and quickly assembled in the field. By separation of the motor from the rocket, danger of premature firing is eliminated. Also very little skill is required to assemble the rocket, which enhances rapid firing of rockets in the field.

While a specific embodiment of the invention has been shown and described, it will be understood that various alterations may be made without departure from the spirit of invention as indicated by the appended claims.

I claim:

1. In a two-part rocket, comprising a warhead, and a separable rocket motor adapted to be received in sliding intussuscepted relation with the rearward end of said warhead, a compartment in said warhead for receiving an inert fluid under pressure, a pair of discrete and co-axial tanks in said rocket motor, a fluid oxidizer in one of said tanks, a fluid propellent fuel in said other tank, a co-axial combustion chamber integral with said rocket motor and disposed in contiguous relation rearwardly of said co-axial tanks, exhaust nozzles in said rocket motor providing communication between said combustion chamber and the atmosphere, a rupturable diaphragm in said rocket motor separating said co-axial tanks from said compartment, there being an axial space between said diaphragm and said compartment when said rocket is assembled, and means responsive to the forward ramming of said motor into said warhead to release said inert fluid from said compartment to rupture said diaphragm, whereby the pressure exerted by said inert fluid on said oxidizer and fuel expels the same into said combustion chamber to be united and spontaneously combusted to drive said rocket.

2. The rocket in claim 1, wherein said inert fluid is an inert gas.

3. The rocket in claim 1, wherein said oxidizer is a substance from the group consisting of nitric acid, liquid nitrogen dioxide, and hydrogen peroxide.

4. The rocket in claim 2 wherein the outer tank of said co-axial tanks comprises a flexible wall expansible to sealingly engage the wall of said warhead in response to pressure of said inert gas.

5. The rocket in claim 2, wherein said means to release said inert gas comprises a first transverse wall defining the rearward extremity of said compartment, there being a central aperture formed in said first transverse wall, a releasable plug sealingly engaging said opening, a second transverse wall integral with said rocket motor and intermediate said rupturable diaphragm and said first transverse wall, a forwardly extending axial boss integral with said second transverse wall, there being an axial passage formed in said boss and said second transverse wall, said axial boss adapted to engage and to unseat said sealing plug when said rocket motor is rammed forwardly into said warhead to release said inert gas for pressure contact with said rupturable diaphragm.

6. A two part rocket comprising, a warhead, a separable rocket motor adapted to be received in sliding intussuscepted relation with the rearward portion of said warhead, an inert gas received in said warhead, a pair of discrete tanks in said rocket motor each for receiving a corresponding one of two hypergolic fuels, a combustion chamber integral with said motor and including a rocket exhaust nozzle, means placing said tanks in communication with said combustion chamber when the hypergolic fuels are under pressure, and means responsive to the forward ramming of said rocket motor in said warhead to release said inert gas for pressure contact with the hypergolic fuels, whereby the fuels unite in said combustion chamber to spontaneously ignite and to drive said rocket.

7. The rocket of claim 6 wherein said discrete tanks are co-axially disposed with the outer of said tanks having an external flexible wall adapted to sealingly engage said warhead in response to pressure exerted on said fuel by the release of said inert gas.

8. In a two part rocket, a warhead, a payload located forwardly in said warhead, said warhead having a rearwardly extending outer cylindrical wall forming a space having an open rear end, a transverse wall dividing said space into a first forward compartment and a second space for receiving a rocket motor, there being a central opening formed in said transverse wall, a plug sealingly engaging said opening, a pressurized inert gas in said compartment, a separable rocket motor adapted to extend partially into said second space and comprising, a tubular outer wall, a forward transverse wall, and a rearward transverse wall, a rupturable transverse diaphragm rearwardly and in contiguous co-extensive relation with said forward transverse wall, a co-axial sleeve concentric with said outer wall and extending between said rupturable diaphragm and said rearward transverse wall, said sleeve forming with said outer wall, and said rupturable diaphragm, and rear transverse wall, a pair of discrete co-axial tanks, a fluid oxidizer in one of said tanks, a fluid propellant in said other tank, said oxidizer and propellant igniting spontaneously when united, a rearwardly extending co-axial combustion chamber integral with said rearward transverse wall, there being a plurality of fluid escape ports formed in said rear transverse wall providing communication between said co-axial tanks and said combustion chamber, a plurality of gas exhaust nozzles in said combustion chamber, there being an axial space between said forward transverse wall and said transverse wall defining the rear end of said compartment when said rocket motor is in place within said warhead, a forwardly extending axial boss integral with said forward transverse wall, there being an axial fluid passage formed in said boss and extending through said forward transverse wall, said rocket motor adapted to be rammed forwardly in said second space whereby said boss unseats said plug to permit said inert gas to rupture said diaphragm and pressurize said oxidizer and propellent fuel to force the same into said combustion chamber.

9. The rocket of claim 8, wherein said outer wall is a flexible plastic expandable when said outer tank is pressurized to provide sealing engagement between said outer wall and the inner wall of said second space.

10. A two-part rocket self-propelled by inter-mixture of hypergolic fuels comprising, a first forward portion including a pressure tight tank adapted to confine a gas under pressure, a second rearward motor portion including first and second co-axial discrete fuel chambers each adapted to contain a respective one of two hypergolic fuels, a driving nozzle integral with said second portion, and including a combustion chamber, there being respective passageways between said combustion chamber and each of said fuel chambers, said first and second fuel chambers each having a rupturable wall, means carried by the rearward end of said forward portion for guiding the forward end of said second portion into fixed co-axial union with said first portion and means responsive to union of said portion as aforesaid to automatically apply the pressure in said tank to said walls whereby the walls are ruptured and fuels in said fuel chambers are forced into said combustion chamber.

11. A rocket comprising a missile body, a detachable rocket motor including fuel storage means, combustion chamber means, and normally closed communicating means between said fuel storage means and said combustion chamber, normally closed tank means containing a pressurized gas, and means operative upon insertion of said rocket motor into said missile body for operatively connecting said tank means to said fuel storage means and for opening said connecting means whereby the pressurized gases force the fuel in said storage means through said connecting means into said combustion chamber for combustion therein to propel the rocket.

References Cited in the file of this patent

UNITED STATES PATENTS

| 2,470,489 | Hopkins | May 17, 1949 |

FOREIGN PATENTS

| 197,518 | Great Britain | May 17, 1923 |